United States Patent [19]

Lee

[11] Patent Number: 5,122,546
[45] Date of Patent: Jun. 16, 1992

[54] POLYIMIDE FOAM PRECURSOR

[75] Inventor: Raymond Lee, Baton Rouge, La.

[73] Assignee: Ethyl Corporation, Richmond, Va.

[21] Appl. No.: 652,865

[22] Filed: Feb. 8, 1991

Related U.S. Application Data

[63] Continuation-in-part of Ser. No. 575,982, Aug. 30, 1990, which is a continuation-in-part of Ser. No. 466,122, Jan. 16, 1990, abandoned.

[51] Int. Cl.$^5$ .............................................. C08J 9/14
[52] U.S. Cl. .................................. 521/88; 521/117; 521/183; 521/184; 521/185; 521/189
[58] Field of Search ............... 521/183, 184, 185, 189, 521/88, 117

[56] References Cited

U.S. PATENT DOCUMENTS

| | | | |
|---|---|---|---|
| Re. 30,213 | 2/1980 | Gagliani et al. | 521/185 |
| 3,506,583 | 4/1970 | Boram et al. | 252/188.3 |
| 3,554,939 | 1/1971 | Lavin et al. | 260/2.5 |
| 4,153,783 | 5/1979 | Gagliani et al. | 528/337 |
| 4,161,477 | 7/1979 | Long et al. | 260/326 |
| 4,183,838 | 1/1980 | Gagliani | 260/32.6 |
| 4,183,839 | 1/1980 | Gagliani | 260/37 N |
| 4,296,208 | 10/1981 | Gagliani et al. | 521/77 |
| 4,305,796 | 2/1985 | Gagliani et al. | 204/159.19 |
| 4,353,998 | 10/1982 | Gagliani et al. | 523/219 |
| 4,439,381 | 3/1984 | Gagliani et al. | 264/26 |
| 4,476,254 | 10/1984 | Long et al. | 521/180 |
| 4,506,038 | 3/1985 | Gagliani et al. | 521/103 |
| 4,518,717 | 5/1985 | Long et al. | 521/109.1 |
| 4,599,365 | 7/1986 | Gagliani et al. | 521/189 |
| 4,621,015 | 11/1986 | Long et al. | 521/183 |
| 4,647,597 | 3/1987 | Shulman et al. | 521/185 |
| 4,656,198 | 4/1987 | Shulman et al. | 521/56 |
| 4,855,332 | 8/1989 | Indyke | 521/184 |
| 4,900,761 | 2/1990 | Lee et al. | 521/184 |
| 4,913,759 | 4/1990 | Wright | 156/238 |
| 4,978,692 | 12/1990 | Ezawa et al. | 521/185 |

OTHER PUBLICATIONS

Final Report NAS 9-14718, "Fire Resistant Resilient Foams", Feb. 1976, Gagliani.
Final Report NAS 9-15050, "Development of Fire-Resistant, Low Smoke Generating, Thermally Stable End Items for Aircraft and Spacecraft", Jun. 1977, Gagliani et al.
Final Report NAS -15484, "Development of Fire-Resistant, Low Smoke Generating Thermally Stable End Items for Commercial Aircraft and Spacecraft Using a Basic Polyimide Resin" Dec. 15, 1977 to Apr. 15, 1980, Gagliani, et al.
Final Report NAS-16009, "Formulation and Characterization for Polyimide Resilient Foams of Various Densities for Aircraft Seating Applications".

*Primary Examiner*—Morton Foelak
*Attorney, Agent, or Firm*—Richard J. Hammond

[57] ABSTRACT

A slurry is produced by adding to a polyimide precursor comprising carboxylic and diamine components at least one foam-enhancing polar, protic additive of the formula ROH, where R is hydrogen, or $C_1$ to $C_{12}$ linear or branched alkyl or cycloalkyl, affording a slurry. The slurry is then brought to a temperature in the range of about 40° C. to about 105° C., producing a homogeneous, transparent solution, opaque suspension, or melt. When heated to a higher temperature the melt foams and cures.

13 Claims, No Drawings

POLYIMIDE FOAM PRECURSOR

This is a continuation-in-part of application Ser. No. 07/575,982, filed Aug. 30, 1990, which is a continuation-in-part of application Ser. No. 07/466,122, now abandoned filed Jan. 16, 1990.

This invention relates to polyimide foams, especially to the production of such foams from a precursor melt, as well as the melt itself. Polyimide foams are useful in fire-resistant thermal insulation and other applications.

BACKGROUND

Historically, there have been three general ways to produce polyimide foams. According to the process described in Lavin et al. U.S. Pat. No. 3,554,939, a monomer mixture composed of an ester of benzophenone tetracarboxylic acid and a polyamine, the mixture having a volatile content (defined as percent weight loss in 10 minutes at 300° C.) of at least 9%, is heated to a critical temperature at which foaming occurs contemporaneously with polymerization of the tetracarboxylic and polyamine components until the polyimide foam is formed.

In another procedure, described by Gagliani in Final Report NAS 9-14718 entitled "Fire Resistant Resilient Foams" dated February 1976, a mixture of diamines is added to an alcoholic solution of the half ester of benzophenone tetracarboxylic acid and reacted at 158°-167° F. (70°-75° C.) to form a heavy syrup. This syrup is heated in a circulating air oven at 180° F. (82.2° C.) for about 12-16 hours and the in a vacuum oven at 176°-194° F. (80°-90° C.) for 60-90 minutes, producing a polyimide precursor. Thereafter, the polyimide precursor is pulverized into a powder which is spread over aluminum foil on an aluminum plate and heated at 600.F (315.6.C) in an oven for 30 minutes to produce the foam. In a similar procedure reported by Gagliani et al. in Final Report NAS 9-15050 entitled "Development of Fire-Resistant, Low Smoke Generating, Thermally Stable End Items for Aircraft and Spacecraft" dated June 1977, the dried precursor powder formed in about the same manner was subjected, inter alia, to multi-stage heating, in which the powder was placed in a pressure vessel positioned within an oven preheated at 450° F. (232° C.) and held at this temperature at a reduced pressure (19.9-9.9 inches of Hg) for 15-30 minutes. The resulting foam was then postcured at 600° F. (315.6° C.) for 15-30 minutes in a circulating air oven.

The third procedure involves use of microwave radiation for converting the polyimide precursor into a cellular structure which normally is then subjected to final curing in a thermal oven. In actual practice the precursor is used in the form of a powder produced by spray drying an alcoholic solution of the tetracarboxylic and diamine components. See, for example, Gagliani et al. U.S. Pat. Nos. 4,296,208; 4,305,796; 4,439,381; and 4,599,365; Final Report NAS 9-15050 (supra); Final Report NAS 9-15484 entitled "Development of Fire-Resistant, Low Smoke Generating, Thermally Stable End Items for Commercial Aircraft and Spacecraft Using a Basic Polyimide Resin" and Final Report NAS 9-16009 entitled "Formulation and Characterization of Polyimide Resilient Foams of Various Densities for Aircraft Seating Applications". In U.S. Pat. Nos. 4,305,796 and 4,439,381 it is indicated that the polyimide precursor may vary from a 'liquid resin' to a spreadable, paste-like formulation, depending upon the nature and quantity of any fillers added to the resin.

Precursors which lead to polyimide foam upon heating have been described in various terms. U.S. Pat. No. 3,506,583, which issued in 1970, refers to the precursor as a substantially monomeric "solid solution resinoid." In U.S. Pat. No. 4,900,761 the mixture of substantially equal molar amounts of tetracarboxylic component (generally di-half ester) and diamine component is termed a "paste resin" if the solids content is high and a "liquid resin" if more of the esterifying alcohol is present. U.S. Pat. No. 4,153,783 teaches that free volatiles, e.g., alcohol or water, are detrimental to the foaming process.

The polyimide precursor, regardless of its denomination, has generally been pulverized or ground into a powder. If sufficient alcohol esterifying agent is present or can be added, it has been spray-dried, producing a powder. The powder is then spread as evenly as possible into a mold or onto a substantially flat, horizontal surface which is then heated to foam and finally imidize the powder. However, working with the precursor powder can be hazardous to workmen, because the powder contains amines, many of which are toxic, and the powder fines are easily airborne. In addition, it is difficult to spread the powder uniformly into a mold or onto a surface.

It is known that the foaming of polyimides is related to volatile by-products generated in the amidization and/or imidization reactions. According to U.S. Pat. No. 4,900,761 small changes in the solids content of the polyimide precursor lead to large changes in the density of the resultant foam, but the exemplified changes are random and unpredictable. Application Ser. No. 07/466,122 discloses a process for making polyimide foam whereby a polar protic foam-enhancing material is added to a substantially equimolar mixture of carboxylic and diamine components; the amount added is between about 1/200 and $\frac{1}{2}$ parts by weight of the sum of the diamine and carboxylic components. The resultant mixture is termed a slurry. The slurry can be heated, producing a homogeneous "melt," which can then be foamed. Copending application Ser. No. 07/575,982 discloses foams in a range of densities which are produced by controlling the amount of the polar protic foam enhancing-additive which is present in the slurry. The subject matter of the instant application is related to that of the these two earlier applications.

SUMMARY OF THE INVENTION

Accordingly, it is an object of this invention to provide a "melt", also referred to herein as expandable, composition, which can be handled safely in the workplace, which makes it possible to avoid precursor powder all together, which can be introduced uniformly and reproducibly into a mold or other container for foaming, and from which polyimide foam is readily produced. The melt itself is a unique composition of matter that exists only within a certain range of temperatures.

According to the present invention, a polar protic foam-enhancing additive is incorporated into a polyimide precursor composition, which includes substantially equal molar amounts of carboxylic and diamine components, producing a slurry. The melt comprises a slurry brought to a temperature sufficient to produce a viscous, homogeneous, transparent solution or opaque suspension. The maximum temperature of the melt is that temperature above which a further increase in temperature leads to foaming in a matter of minutes. The minimum temperature of the melt is the lowest temperature at which the melt can, in a matter of minutes, be poured from a container and spread uniformly on a horizontal surface. In general, this latter temperature is about 40° C. to about 60° C., in which range the viscosity of a melt is about $5 \times 10^6$ cps to about $16 \times 10^7$ cps.

The polar protic foam-enhancing additive has the formula ROH, where R is hydrogen, or a $C_1$ to $C_{12}$ linear or branched alkyl or cycloalkyl radical, which may be unsubstituted or substituted with halo, aryl, alkoxy and hydroxy. The polar protic foam-enhancing additive need not be miscible with or act as a solvent for any of the components of the precursor composition under ambient, i.e. room temperature, conditions. However, when the additive is heated with the polyimide precursor to a temperature below that of foam production, the mixture first begins to soften, dissolve and ultimately forms a homogeneous, transparent solution, opaque suspension, or "melt." At this stage, the temperature of the melt ordinarily should not exceed about 105° C. in order to avoid foaming. The temperature at which the melt exists is in the range of about 40° to about 105° C., most preferably about 40° to about 60° C.

DETAILED DESCRIPTION

The polar protic foam-enhancing additives ROH include water, i.e., where R is hydrogen, and also alcohols, as well as polyols, such as glycols, any of which can be utilized individually or in combination. Thus, when R is $C_1$ to $C_{12}$ linear or branched alkyl or cycloalkyl, these additives include one or more of the lower alcohols, such as methanol, ethanol, or cyclohexanol, as well as those with more complexity, such as 1-octanol, 2-methyldcan-1-ol, 2-ethylhexan-1-ol, cyclopentanol, cyclohexanol and the like, which can be used in combination. Preferably, such alkyl groups are $C_1$ to $C_6$ linear or branched alkyl, i.e., lower alkyl. One requirement of the polar protic foam-enhancing additive is that it is volatile under the conditions used to produce foam. The term "volatile" as used herein means the vapor pressure of the additive is high enough to affect the foam density under the foaming conditions employed. The amount of the polar protic foam-enhancing additive in a slurry is equal to the "free volatiles" content of the slurry, measured as described hereinafter.

In the aforesaid additives, the preferred alkyl R groups may be substituted with halo, aryl, alkoxy or hydroxy. Illustrative of the halo-substituted polar protic foam-enhancing additives are 2-chloroethanol, 3-chloropropanol, 4-chlorobutanol and the like. Alkoxy as well as aryl radicals may also be substituted on the alkyl R groups and include phenylmethyl (benzyl), 2-phenylethyl (dihydrocinnamyl), methoxymethyl, ethoxymethyl and the like. Where the substituent on R is a hydroxy group, the alkyl hydroxides are typically called glycols, and such include ethylene glycol, propylene glycol, 1,6-hexandiol and the like.

Typically, the polar protic foam-enhancing additive is added to the polyimide precursor at a ratio between about 200 parts by weight precursor to 1 part by weight ROH and about 2 parts by weight precursor to 1 part by weight ROH. Preferably these ratios are from about 100 to 1 to about 5 to 1, most preferably from about 75 to 1 to about 7 to 1. The "melt" referred to herein comprises a heated slurry of a polyimide precursor, which can be, but need not be, a particulate, e.g., spray-dried, polyimide precursor powder, in combination with a polar protic foam-enhancing additive. The polyimide precursor comprises one or more tetracarboxylic components and one or more primary, di-, or polyamine components.

Preferably the tetracarboxylic components are esters, predominantly diesters (half esters) of aromatic tetracarboxylic acids and lower alkanols such as methanol, ethanol, isopropanol, propanol, the butanols, the pentanols, the hexanols, and the like. The primary polyamine components employed are preferably aromatic diamines, heterocyclic diamines, or combinations thereof, optionally with a minor proportion of one or more aliphatic diamines.

The organic tetracarboxylic acids or derivatives thereof are preferably based on tetracarboxylic acids having the general formula:

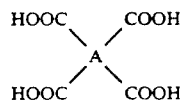

wherein A is a tetravalent organic group. Although A can be an aliphatic group, such as the following butyl group, it is

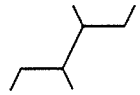

preferred that the organic group A be an aromatic group having a structure such as the following, it being understood the structures shown are illustrative, but not limiting:

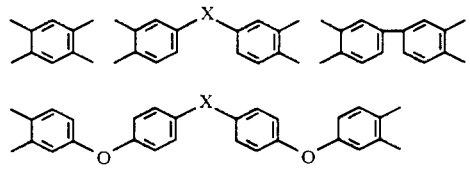

wherein X is one or more the following:

$$-\underset{\underset{O}{\|}}{C}-; \quad -O-; \quad -S-; \quad -SO_2-; \quad -CH_2-; \quad -CH_2CH_2-;$$

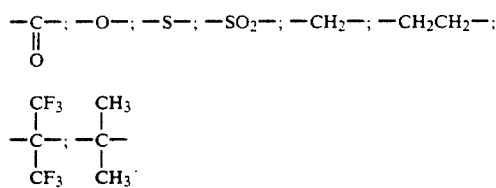

although other aromatic groups are suitable. The tetracarboxylic acid derivatives which may be employed include anhydrides, acid halides, esters, and the like. Of these, esters are preferred and are most generally used for foam production.

Preferred among the tetracarboxylic acid esters are the alkyl esters of 3,3',4,4'-benzophenone tetracarboxylic acid, most preferably the lower ($C_1$ to $C_6$ linear or branched chain) alkyl, e.g., methyl or ethyl, diesters thereof. Mixtures of two or more aromatic esters, most preferably predominating in diesters, may be employed, if desired.

It is also possible, in accordance with this invention, that the tetracarboxylic component employed in the manufacture of the polyimide foams be a caprolactam derivative as disclosed in U.S. Pat. Nos. 4,161,477, 4,183,838 and 4,183,839, the contents of which are incorporated herein by reference.

The tetracarboxylic component may also be an N-substituted imido acid ester of the tetracarboxylic acid as disclosed in U.S. Pat. Nos. 4,647,597 and 4,656,198, the contents of which are incorporated herein by reference.

The organic diamine component of the polyimide precursor may be represented by the formula:

H$_2$N13 R'—NH$_2$ wherein R' is an aromatic group containing about 5 to 16 carbon atoms and which may contain at least one hetero atom in the aromatic ring, the hetero atom being nitrogen, oxygen or sulfur. Also included are aromatic groups such as the following, it being understood the structures shown are illustrative, but not limiting:

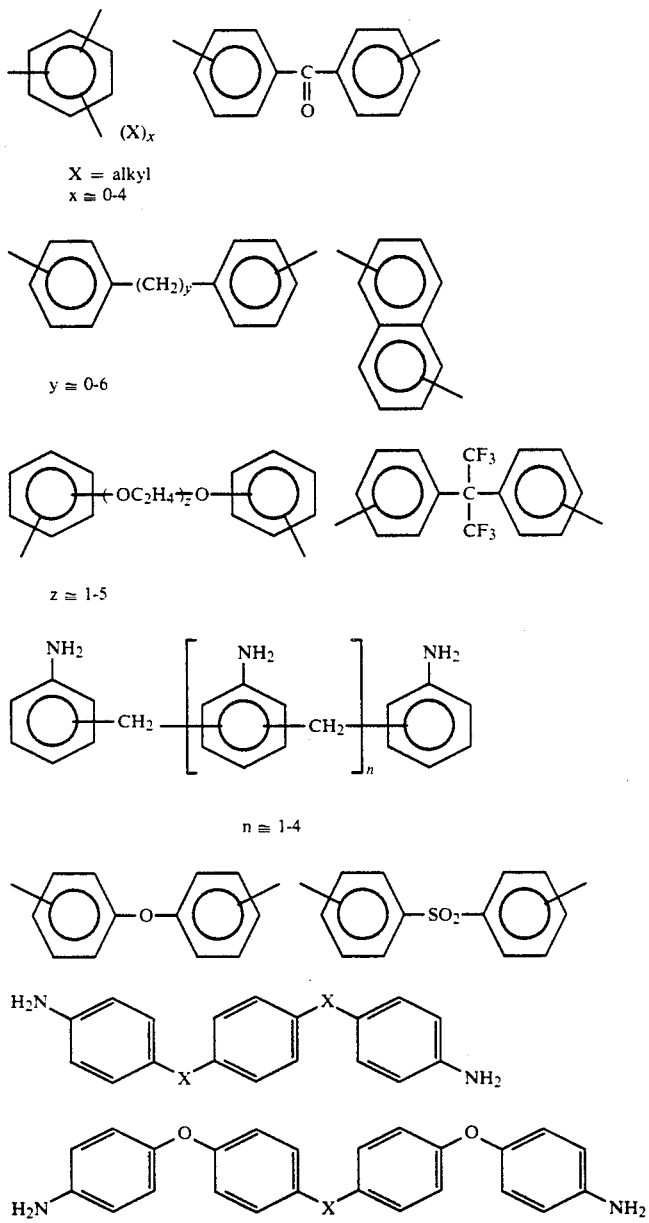

where X is selected from

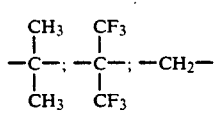

Representatives of such diamines include:
2,6-diaminopyridine
3,5-diaminopyridine;
3,3'-diaminodiphenylsulfone;
4,4'-diaminodiphenylsulfone;
4,4'-diaminodiphenylsulfide;
3,3'-diaminodiphenylether;
4,4'-diaminodiphenylether;
metha-phenylenediamine;

para-phenylenediamine;
4,4'-methylene dianiline;
2,6-diamino toluene;
2,4-diamino toluene;
2,2-bis[4-(4-aminophenoxy)phenyl]propane 4,4'-[1,4-phenylene(1-methylethylidene)]bis(benzenamine)
and the like.

It is also possible and sometimes desirable in the preparation of the polyimide precursors, to include in the reaction mixture one or more aliphatic diamines. Such aliphatic diamines are preferably alpha-omega diaminoalkanes having the formula:

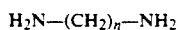

$H_2N-(CH_2)_n-NH_2$ wherein n is an integer from 2 to 16. Representatives of such diamines include 1,3-diaminopropane, 1,4-diaminobutane, 1,5-diaminopentane, 1,6-diaminohexane, etc. Alternatively, heteroaliphatic diamines, such as 1-(2-aminoethyl)piperizine, can be employed.

In place of or in addition to the foregoing aliphatic amines, use can be made of aliphatic etherified polyamines such as polyoxypropylene diamines having the formula:

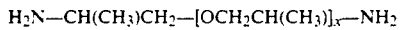

$H_2N-CH(CH_3)CH_2-[OCH_2CH(CH_3)]_x-NH_2$ wherein x varies from about 1 to about 5. Polyoxyethylenediamines are also useful. A number of aliphatic etherified polyamines, e.g., Jeffamine EDR-148, T-403, D-2000, and T-3000, are available from Jefferson Chemical Co.

Other useful primary diamines which may be included in the polyimide precursor include amino-terminated butadiene-nitrile copolymers having the general formula:

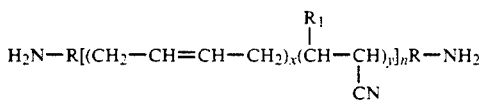

$$H_2N-R[(CH_2-CH=CH-CH_2)_x(CH-CH)_y]_nR-NH_2$$
$$\underset{CN}{|}$$

wherein R is either a phenylene group or an alkylene group, $R_1$ is hydrogen or methyl, and x and y are each independently integers ranging from 1 to 25 and n is an integer, preferably below 20. In these copolymers it is preferred that butadiene constitute at least 50% by weight of the butadiene and nitrile monomers. The nitrile monomer copolymerized with the butadiene can either be acrylonitrile or methacrylonitrile. Such copolymers generally have low molecular weights, preferably less than 3,000, to insure that they are sufficiently fluid to react in the formation of the polyimide as well as sufficiently fluid so as to be capable of foaming.

Still another type of primary diamine component which may be included in the polyimide precursor are aromatic amino-terminated silicones, such as those having the general formula:

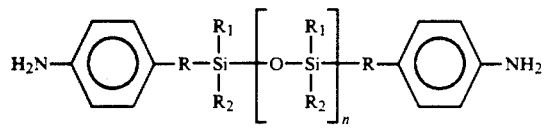

wherein R is a $C_2$ to $C_6$ alkylene group, $R_1$ and $R_2$ are each independently lower alkyl containing 1 to 3 carbon atoms and n is an integer from 1 to 4. Another useful siloxane is diaminopropylpolydimethyl siloxane, which is available from General Electric Co. as "G-10."

Another preferred category of diamines which may be utilized in the polyimide precursor are the diesters produced from amino-substituted aromatic carboxylic acids and polymethylene glycols. Such diesters may be represented by the general formula:

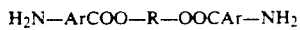

$H_2N-ArCOO-R-OOCAr-NH_2$ wherein R is an alkylene group (which may be branched or straight chain) and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups. A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;
tetramethylene glycol-3-amino-4-nitrobenzoic acid diester;
tetramethylene glycol-3-amino-5-nitrobenzoic acid diester
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester;
and the like. Mixtures of such diesters may be employed.

A particularly preferred diester of this type is the diester of trimethylene glycol (1,3-propanediol) and 4-aminobenzoio acid.

The relative proportions of the reactants used in the preparation of the polyimide precursor can be varied. In general, it is preferred to employ essentially stoichiometric proportions of the tetracarboxylic component and the primary diamine component.

When using a lower alkyl ester of the tetracarboxylic acid, either or both the alcohol produced and the water released during the amidization/imidization reactions, can, in addition to the polar protic foam-enhancing additive, function as the blowing agent during polymerization to form the desired polyimide foams. In addition, use can be made of any of a variety of well-known organic or inorganic blowing agents which can be introduced separately. Variations in the concentration of the blowing agent can be used to achieve specific densities and ILD (indention load deflection) values. However, the use of ROH, as defined above, is preferred as the sole blowing agent, since the foams produced thereby are superior.

The polyimide precursor may also contain various filler and/or reinforcing materials. For example, graphite, glass and other synthetic fibers can be added to the precursor composition to produce a fiber-reinforced product. Glass or phenolic micro balloons may be added for density adjustment, if desired, but the microballoons increase density at the expense of flexibility.

It is frequently desirable to also add one or more surfactants to the polyimide precursor, thereby increasing cell stability and uniformity, increasing fatigue resistance, and also making the foam more flexible and resilient. The nature of such surfactants for this use is well known and reported in the patent literature.

When producing foams from tetracarboxylic components other than lower alkyl esters, a blowing agent and/or microballoons generally have been employed in order to achieve a suitable cellular structure.

Although not necessary, for some applications it is desirable that the polyimide precursor contain a suitable quantity of a flame retardant material in order to still further increase the flame resistance of the foam.

Polyimide foams of good quality are produced from the melt obtained by combining a polyimide precursor with the foam-enhancing additive, producing a slurry, and then heating the slurry at not more than about 105° C. Thereafter, the melt is heated at one or more temperatures sufficient to obtain a consolidated but friable cellular foam structure, and in at least one other stage this cellular foam structure is heated at one or more higher temperatures sufficient to cure the cellular material into a resilient polyimide foam. Preferably, these stages are conducted in a continuous manner as by supporting the material being foamed on a moving belt or rotating platform associated with appropriate heating apparatus maintained at suitable temperatures (e.g., one or more tunnel heaters, etc., with appropriate temperature zones along the path of travel). Alternatively, natively, a single furnace, oven or other thermal apparatus is employed whereby the material being foamed is kept more or less in one place, and the heat applied thereto is suitably increased during the period of time the melt, developing cellular structure and developed cellular structure are maintained in the apparatus. Any type of apparatus may be used for applying the thermal energy to the melt, to the cellular structure as it is developing therefrom, and to the resultant developed cellular structure. Such equipment includes radiant heaters; furnaces operated on natural gas, LPG, fuel oil, etc.; dielectric heaters; microwave cavities; and the like. However, use of microwave or thermal ovens (e.g., a single circulating air electric oven operated such that its temperature is appropriately increased during the residency of the material being processed therein, or two or more electric resistance heaters positioned in and along the length of a tunnel or cavity with their temperatures suitably set or regulated such that the material being conveyed therethrough encounters increased temperatures during its travel) are preferred because of the lower capital and operating costs involved when using such apparatus. The cured polyimide foam may of course be subjected to a final postcuring at still higher temperatures if desired.

In most cases the foam structure is produced from the melt at temperatures within the range of about 120° to about 180° C., and preferably in the range of about 135° to about 170° C. (about 275° to about 325° F.), and curing is effected at temperatures of at least about 220° C. (preferably at least about 230° C.). However, departures from these ranges are permissible where the circumstances warrant or justify such departures. Usually temperatures above about 425° C. are not used, as thermal degradation of the foam may be encountered, depending of course on the composition of the foam being processed, some foams having greater thermal stability than others.

Any of a number of procedures may be used for forming the melt composition. For example, the tetracarboxylic and diamine components may be mixed with a suitable solvent or liquid diluent and the polar protic foam-enhancing agent in appropriate proportions to form the slurry directly. Similarly, a more dilute solution of the components may be concentrated to the desired solids content as by use of vacuum distillation at a suitably low temperature such that excessive reaction between the tetracarboxylic and diamine components does not occur. Generally speaking, melt compositions with a solids content in the range of about 60 to about 90 weight percent, i.e., a total volatiles content of about 40 to about 10 wt. %, are preferred, and those with a solids content in the range of about 65 to about 85 weight percent are particularly preferred.

Having described the basic concepts of this invention, reference is now made to the following examples which serve to still further illustrate the practice and advantages of this invention. Melt viscosities ("vis" below) which appear in this application are determined with a Brookfield viscometer, Series RVT using a T-bar spindle. "Total volatiles", wherever used in this application, is the percent weight lost from a sample heated for 30 minutes at a temperature of 260° C. It is believed to include both the free volatiles, such as solvent, as well as the bound volatiles which arise from amidization and imidization reactions. "Free volatiles", wherever used in this application, is the percent weight lost from a sample heated at 50° C. under vacuum (30 in. Hg) for 3 hr. Free volatiles is equivalent to the wt. % of the polar protic foam-enhancing additive in the sample.

EXAMPLE 1

To a 1.0 liter three-neck, round-bottom glass flask, equipped with a mechanical stirrer, thermometer, heating jacket, and condenser, is added 320 mL (8.0 moles) methyl alcohol, and 24 mL (1.33 moles) distilled water. The solution is thoroughly mixed and 322.23 g (1.0 mole) benzophenonetetracarboxylic acid dianhydride (BTDA) are added with stirring. This mixture is then heated to reflux to form the methyl ester of the BTDA. Once the esterification reaction is complete, the clear solution is cooled to below 40° C. and 158.6 g (0.8 mole) of methylene dianaline (MDA) are added. After the MDA has completely dissolved, 21.8 g (0.2 mole) of diaminopyridine (DAP) are added and mixed until dissolved. This is followed by the addition of 7.0 grams (1.5 percent by weight of the polyimide solids) of a silicone glycol surfactant, Dow Corning 193. The solution is thoroughly mixed to yield a liquid polyimide precursor.

The liquid polyimide precursor is processed into powder, i.e., a particulate material, using a spray dryer or a vacuum dryer.

EXAMPLE 2

About 300 g of polyimide precursor (prepared as described in Example 1) was placed in a "sigma-blade" mixer, along with an appropriate amount of water and heated to about 55° C. The mixer was then turned on and the materials mixed (about 1 hour) until a homogeneous paste, resembling taffy, was obtained. The melt was then poured out onto a heat resistant, microwave compatible (e.g. teflon coated glass cloth) substrate. The melt was then placed in a Gerling-Moore laboratory microwave oven operating at a frequency of 2450 mHz for 20 minutes at 200 watts for preheating. Once the melt was thoroughly preheated the melt was foamed for 20 minutes at 220 watts followed by curing for 20 minutes at 2200 watts followed by 60 minute thermal post-cure at 500° F. A low density, resilient polyimide foam is obtained.

The effect of varying the amount of water added is described in Table 1.

TABLE 1

| Conc Water Added (%) | % Water by Karl Fisher Analysis | Density$^a$ | Tensile$^b$ Strength | Thermal$^c$ K. |
|---|---|---|---|---|
| 0 (Powder only) | 0.8 | 0.68 | 12.3 | 0.28 |
| 3 | 3.1 | 0.51 | 11.1 | 0.30 |
| 5 | 4.1 | 0.46 | 6.5 | 0.34 |

$^a$lb/ft$^3$
$^b$psi
$^c$(BTU · in)/hr · ft$^2$ · °F.

EXAMPLE 3

A melt composition, having a solids content of 65–70 percent and a surfactant concentration of 4.0 percent, was prepared using the method described in Example 2 and was mixed with varying amounts of carbon fibers, ranging in concentration from 0.5–50 percent. These filled resins were then foamed and cured as described in Example 2 to obtain a series of reinforced foams. It was found that as the concentration of fiber increased the density of the foam increased, and the foam became more rigid.

EXAMPLE 4

In a 12 l three neck flask, equipped with a stirrer, 4.189 kg of 3,3',4,4'-benzophenone tetracarboxylic acid (BTDA), 1.440 kg of CH$_3$OH and 90 g of water were heated to reflux. Once the solution became clear heating was continued for an additional hour to insure complete conversion to the diester derivative. The diester solution was transferred to a 1 gallon capacity "sigma-blade" mixer, and 1.838 kg of 4,4'-methylene dianiline (MDA) was added and mixed for 15 minutes. Then 434 g of 2,6-diaminopyridine (DAP) was added and the heating to jacket set at 60° C. Heating and mixing continued for 26 minutes, temperature at 60° C., and 90.1 g of surfactant was added along with 296 g H$_2$O. The resultant melt was mixed for an additional hour.

The melt was then poured out, and four buns (about 1500 g each) foamed in a Gerling-Moore laboratory microwave oven. The melt was preheated 3 minutes at 1400 watts, followed by foaming for 30 minutes at 2200 watts, followed by curing for 15 minutes at 4000 watts and a thermal oven post-cure of 60 minutes at 500° F.

The articles were low density, flexible, resilient polyimide foams.

EXAMPLE 5

An analysis of the powder particulate polyimide precursor prepared in an identical manner as that of Example 1 revealed that it had a total volatiles content of 20.6%, with 0.58% of such volatiles being water. The powder was exposed to the air (ambient temperature and pressure) for 30 minutes. Analysis of the resulting powder gave total volatiles of 20.9%, with 2.74% being water. A total water gain of 2.16 wt. % therefore occurred, with total volatiles slightly elevated i.e., a loss in the volatile components of 1.86 wt. % occurred.

The resulting polyimide precursor powder isolated from the above procedure was foamed by the same process as shown in Example 4. The polyimide foam bun produced had a tensile strength of 10.33 psi (average of two); a density of 0.589 lbs/ft$^3$ (average of two); and a thermal K of 0.305 (BTU·in)/(hr·ft$^2$·°F.)

EXAMPLE 6

To 35 lb. quantities of polyimide precursor powder prepared as described in Example 1 was added 7to ml of a mixture of various ratios of water and methanol in a mixer as described in Example 2. The resultant melts were then foamed as set forth in the latter Example. The results obtained are set forth in Table 2.

TABLE 2

| MEOH (ml) | H$_2$O (ml) | Foam density (lb/ft$^3$) |
|---|---|---|
| 0 | 700 | 0.38 |
| 100 | 600 | 0.43 |
| 200 | 500 | 0.44 |

EXAMPLE 7

A polyimide precursor is prepared in the manner of Example 1, except that the molar ratio (MDA)/(DAP) is 0.715/0.305 rather than 0.8/0.2, and the free volatiles content of the powder particulate precursor is less than about 5 weight percent. Varying amounts of water are added to 500 g portions of the resultant powder, producing a series of slurries. The slurries are mixed and heated at 50° C. to 62° C. for 20 minutes, producing a series of melts. The melts are then foamed and cured by heating the melts first for 30 mins. in a circulating air, convection oven at 68° C., followed by heating in the Gerling-Moore laboratory microwave oven of Example 2 for 20 min. at 1400 watts, followed by 40 min. at 2800 watts. Lastly, the resultant foams are heated in the convection oven for 30 min. at 260° C. The result is a series of foams with a range of densities, as shown in Table 3.

TABLE 3

| Slurry | | Cured Foam | | | |
|---|---|---|---|---|---|
| wt % Added H$_2$O | % total volatiles$^a$ | density lb/ft$^3$ | tensile psi | % LOI$^b$ | thermal K.$^c$ |
| 0 | 19.97 | 0.54 | 7.1 | 37 | 0.312 |
| 3 | 20.68 | 0.48 | 9.9 | 34 | 0.290 |
| 5 | 21.23 | 0.38 | 6.6 | 36 | 0.322 |
| 7 | 21.93 | 0.28 | 6.4 | 36 | 0.363 |
| 9 | 22.13 | 0.25 | 2.1 | 32 | 0.373 |
| 11 | 23.60 | 0.25 | 2.4 | 33 | 0.400 |
| 11 | 25.46 | 0.21 | 2.6 | 32 | 0.383 |
| 13 | 26.92 | 0.21 | 2.0 | 32 | 0.408 |
| 15 | 28.09 | 0.17 |  | 30 | 0.457 |
| 17 | 30.54 | 0.15 | 2.0 | 31 | 0.424 |

$^a$Percent weight lost from sample heated for 30 min. at 260° C.
$^b$Limiting Oxygen Index
$^c$(BTU · in)/(hr · ft$^2$ · °F.)

EXAMPLE 8

Using the methods and polyimide precursor of Example 7, except that varying amounts of several alcohols, equimolar in amount to 3.0 wt. % water, are added to the powder, producing a series of slurries. The slurries are mixed and heated at 60° C. to 63° C. for 20 minutes, producing a series of melts which are foamed and cured in the manner of Example 7. The results are shown in Table 4.

TABLE 4

| | Slurry | | Cured Foam | | | |
|---|---|---|---|---|---|---|
| ROH | wt % Added ROH | % total volatiles[a] | density lb/ft$^3$ | tensile psi | % LOI[b] | thermal K.[c] |
| HOH | 3.0 | 20.68 | 0.48 | 9.9 | 34 | 0.290 |
| MeOH | 5.33 | 27.20 | 0.38 | 5.3 | 33 | 0.342 |
| EtOH | 7.67 | 24.62 | 0.36 | 5.0 | 34 | 0.339 |
| i-PrOH | 9.99 | 25.54 | 0.36 | 7.7 | 34 | 0.323 |
| i-BuOH | 12.38 | 26.62 | 0.32 | 5.6 | 33.5 | 0.372 |

[a]Percent weight lost from sample heated for 30 min. at 260° C.
[b]Limiting Oxygen Index
[c](BTU · in)/(hr · ft$^2$ · °F.)

EXAMPLE 9

1,2,3,4-Butanetetracarboxylic acid dianhydride is reacted with an eight-fold molar excess of methanol at a temperature of 75° C. for 11 hr, yielding the corresponding dimethyl half-ester (BTCDE). The dimethyl half-ester (BTDE) of benzophenonetetracarboxylic acid dianhydride is similarly prepared in excess methanol. Appropriate quantities of the half esters in methanol are mixed to achieve the desired mole ratios, and 30 g or 300 g thereof is transferred to a 100 ml or 1 L beaker, respectively. The beaker and its contents are stirred and heated to 75° C. on a hot plate, and methylene dianiline (MDA) is added to the beaker in an amount which is substantially equimolar to the dianhydride mixture. While at 75° C., water (5% by weight of the combined diamine and diester) is added to the beaker, along with a silicone glycol surfactant (Dow Corning 193) in an amount equal to 2% by weight of the combined diamine and diester. After stirring, the viscous, homogeneous melt is removed from the hotplate, placed on a Teflon-coated glass cloth, smoothed and allowed to cool to room temperature and harden. The solidified melt is foamed in a 5 kW Gerling-Moore laboratory microwave oven at a power level of 2.8 kW for 30 min. The foamed specimen is then placed in a Blue M thermal oven for 30 min. at 260° C. to cure it. The properties of the melts and foams obtained from them at various BTCDE/BTDE ratios appear in Table 5.

TABLE 5

| BTCDE/BTDE molar | PPFEA[a] wt % | Foam D lb/ft$^3$ | Foam Character |
|---|---|---|---|
| 0/100 | 7.82 | 0.46 | flexible, homog. |
| 8/92 | 5.21 | 0.40 | " |
| 15/85 | 6.32 | 0.73 | thin cell walls |
| 22/78 | 4.24 | 0.96 | homog. struct.[b] |
| 26/74 | 12.11 | | " |
| 29/71 | 7.51 | 0.97 | " |
| 35/65 | 5.33 | | filmy cells |
| 62/38 | 5.70 | | " |
| 100/0 | 12.11 | | " |

[a]Polar protic foam-enhancing additive
[b]Used 0.5 wt % surfactant

EXAMPLE 10

Using a procedure like that of Example 9, except that the half-ester (ODPE) of oxydiphthalic anhydride in methanol is combined with the half-ester of BTDE, the melts and foams described in Table 6 are obtained.

TABLE 6

| ODPE/BTDE molar | PPFEA[a] wt % | Foam D lb/ft$^3$ | Foam Character |
|---|---|---|---|
| 0/100 | 8.64 | 0.75 | flexible, resil. |
| 10/90 | 13.3 | 0.61 | " |
| 21/79 | 8.63 | 0.55 | " |
| 81/19 | 7.75 | 0.44 | " |
| 100/0 | 6.94 | 0.58 | " |

[a]Polar protic foam-enhancing additive

EXAMPLE 11

Using a procedure like that of Example 9, except that the half-ester (DPE) of diphthalic anhydride in methanol is combined with the half-ester of BTDE, the melts and foams described in Table 7 are obtained.

TABLE 7

| DPE/BTDE molar | PPFEA[a] wt % | Foam D lb/ft$^3$ | Foam Character |
|---|---|---|---|
| 0/100 | 6.95 | 0.75 | flexible, stri. |
| 5/95 | 10.14 | 0.60 | flexible, homog. |
| 11/89 | 12.33 | 0.50 | flexible, stri. |
| 22/78 | 10.89 | 0.63 | " |
| 42/58 | 4.55 | | brown, brittle |
| 81/19 | 4.61 | | collapsed, char |
| 100/0 | 5.53 | | " |

[a]Polar protic foam-enhancing additive

EXAMPLE 12

By the method of Example 9, except that BTDE is the sole half-ester employed, and varying amounts of the MDA are replaced with 10-100 mole % 2,6-dimethylpyridine (DAP), the melts yielded flexible, resilient foam in all cases.

EXAMPLE 13

By the method of Example 9, except that BTDE is the sole half-ester employed, and varying amounts of the MDA are replaced with diaminopropylpolydimenthylsiloxane ("G-10" from General Electric Co.,), the melts and resultant foams described in Table 8 are obtained.

TABLE 8

| G-10/MDA molar | PPFEA[a] wt % | Foam D lb/ft$^3$ | Foam Character |
|---|---|---|---|
| 0/100 | 7.52 | 0.37 | flexible, resil. |
| 0.5/99.5 | 10.51 | 0.52 | " |
| 1.2/98.8 | 9.25 | 0.37 | " |
| 2.4/97.6 | 7.14 | | foam collapsed |
| 5.0/95 | 12.44 | | " |
| 10/90 | 6.48 | | " |
| 25/75 | 9.43 | | " |

[a]Polar protic foam-enhancing additive

EXAMPLE 14

By the method of Example 9, except that BTDE is the sole half-ester employed, and varying amounts of the MDA are replaced with 2,2-bis[4-(4-aminophenoxy)phenyl]propane (BAPP), the melts and resultant foams described in Table 10 are obtained.

TABLE 10

| BAPP/MDA molar | PPFEA[a] wt % | Melt T/Vis °C./cps | Foam D lb/ft³ | Foam Character |
|---|---|---|---|---|
| 100/0 | | | 0.57 | flexible, resil. |
| 50/50 | 12.5 | 50/18 × 10⁶ | 0.67 | " |
| 40/60 | 9.9 | " | 0.23 | " |
| 30/70 | | | 0.23 | " |
| 20/80 | 7.4 | " | 0.23 | " |

[a]Polar protic foam-enhancing additive

EXAMPLE 15

By the method of Example 9, except that BTDE is the sole half-ester employed, and varying amounts of the MDA are replaced with hexamethylenediamine (HMDA) and/or 2,6-diaminopyridine (DAP), the melts and resultant foams described in Table 11 and 12 are obtained.

TABLE 11

| DAP/HMDA/MDA wt % | PPFEA[a] wt % | Foam D lb/ft³ | Foam Character |
|---|---|---|---|
| 0/13/87 | 10.3 | 0.41 | flexible, resil. |
| 0/8/92 | 8.8 | 0.31 | " |
| 6/11/83 | 12.3 | 0.37 | " |
| 9/8/83 | 10.0 | 0.35 | " |
| 11/8/81 | 10.4 | | " |

[a]Polar protic foam-enhancing additive

TABLE 12

| DAP/HMDA/MDA molar | PPFEA[a] wt % | Melt T/Vis °C./cps | Foam D lb/ft³ | Foam Character |
|---|---|---|---|---|
| 74/17/15 | 12.6 | 50/18 × 10⁶ | 0.41 | flexible, resil. |
| 78/16/18 | 12.6 | " | 0.29 | " |
| 74/17/15 | 7.8 | " | 0.48 | " |

[a]Polar protic foam-enhancing additive

EXAMPLE 16

By the method of Example 9, except that BTDE is the sole half-ester employed, and the diamine component includes 13 wt. % 2,6-diaminopyridine (DAP), 7 wt. % 1-(2-aminoethyl)piperazine (AEP) and 80 wt. % methylenedianiline, a melt containing 9.8 wt. % free volatiles (methanol and water) results, from which a flexible, resilient foam weighting 0.36 lb/ft³ prepared.

EXAMPLE 17

By the method of example 9, except that BTDE is the sole half-ester employed, and varying amounts of the MDA are replaced with metaphenylenediamine (MPA) and/or a polyoxypropylene diamine (T403) commercially available from Jefferson Chemical Co. as Jeffamine T-403, the melts and resultant foams described in Table 13 are obtained.

TABLE 13

| MDA/MPA/T403 molar | PPFEA[a] wt % | Melt T/Vis °C./cps | Foam D lb/ft³ | Foam Character |
|---|---|---|---|---|
| 76/15/9 | 10.5 | 50/18 × 10⁶ | 0.29 | flexible, resil. |
| 87/10/3 | | | 0.37 | " |
| 90/10/0 | | | 0.29 | " |
| 80/20/0 | 10.1 | " | 0.28 | " |
| 70/30/0 | 10.7 | " | 0.27 | " |
| 60/40/0 | 10.3 | " | 0.24 | " |
| 56/44/0 | 10.9 | " | 0.27 | " |

[a]Polar protic foam-enhancing additive

EXAMPLE 18

Melts are produced by the method of Example 9, except that BTDE is the sole half-ester employed, and varying amounts of the following diamines are reacted: Jeffamine EDR 148 (EDR), Jeffamine T-403 (T403), methylene dianiline (MDA), meta-phenylenediamine(MPA), 1-(2-aminoethyl)piperizine (AEP), Jeffamine T-3000 (T3K), 2,6-diaminopyridine (DAP), 2-methylpentmethylenediamine (D0Y), and Jeffamine D-2000 (D2K). The melt compositions and properties appear in Table 14. In each case usable foams are produced by employing the foaming and curing procedures set forth in Example 9.

TABLE 14

| Molar Composition | | | | | | | | | | Foam D lb/ft³ |
|---|---|---|---|---|---|---|---|---|---|---|
| BTDE | EDR | T403 | MDA | MPA | AEP | T3K | DAP | DOY | D2K | |
| .55 | .02 | | .51 | .06 | | | | | | 0.51[c] |
| .55 | | | .50 | .07 | .06 | tr[a] | | | | 0.36 |
| .55 | | .08 | .47 | | tr | | | | | 0.52[f] |
| .55 | | .03 | .47 | .07 | | | | | | 0.48 |
| .56 | | | | .60 | | | | | | 0.25 |
| .56 | | | .34 | .27 | | .10 | | | | 0.33 |
| .72 | | | .61 | | .01 | | | | | 0.34 |
| .55 | | | .50 | | .12 | | | | | 0.24 |
| .55 | | | .58 | | | | | .09 | | 0.27[b] |
| .55 | | .03 | .49 | .09 | | | | | | 0.28 |
| .89 | | .05 | .81 | .11 | | | | | | 0.36 |
| .55 | | | .61 | | | | | | | 0.35 |
| .55 | | .06 | .54 | | | | | | | 0.39 |
| .55 | | | .61 | | | | | | .01 | 0.36[c] |
| .55 | | | .61 | | .01 | | | | | 0.33 |
| .55 | | | .61 | | .03 | | | | | 0.39 |
| .55 | | | | .61 | | | | | | 0.30 |
| .55 | | | .59 | .01 | | | | | tr | 0.32 |
| .55 | | | .59 | .07 | tr | | | | | 0.28 |
| .55 | .05 | | .56 | .07 | | | | | | 0.32 |
| .55 | | | .16 | .48 | tr | | | | | 0.30 |
| .55 | | | | .64 | tr | | | | | 0.25[d] |

TABLE 14-continued

| | | | Molar Composition | | | | | | Foam D |
|---|---|---|---|---|---|---|---|---|---|
| BTDE | EDR | T403 | MDA | MPA | AEP | T3K | DAP | DOY | D2K | lb/ft³ |
| .55 | .05 | | .52 | .07 | tr | | | | | 0.39 |

[a]Trace, i.e., less than 0.01 mole
[b]Viscosity = 5.96 × 10⁶ cps at 41° C.
[c]Viscosity = 16 × 10⁶ cps at 60° C.
[d]Viscosity = 6.6 × 10⁶ cps at 53° C.
[e]Viscosity = 15.8 × 10⁷ cps at 52° C.
[f]Viscosity = 5.7 × 10⁶ cps at 53° C.

EXAMPLE 19

Melts are prepared by the method of Example 9, except that BTDE is the sole half-ester employed, and varying amounts of MDA and Epon 1061M, which is 4,4'[1,4-phenylene(1-methylethylidene)]bis-(benzeneamine), are employed. The melts and resultant foams are listed in Table 15.

TABLE 15

| MDA/Epon 1061M molar | PPFEA[a] wt % | Melt T/Vis °C./cps | Foam D lb/ft³ | Foam Character |
|---|---|---|---|---|
| 92/10 | 9.1 | 50/18 × 10⁶ | 0.25 | flexible, resil. |
| 82/20 | | | 0.27 | " |
| 71/31 | 11.1 | " | 0.30 | " |
| 61/31[b] | | | 0.34 | " |
| 51/51 | 8.8 | " | 0.36 | " |
| 0/102 | | | 0.40 | " |

[a]Polar protic foam-enhancing additive
[b]Also includes 10.2 mole percent BAPP

As can be seen from the foregoing, the melt compositions used in the practice of this invention comprise a slurry of at least (i) one or more organic tetracarboxylic compounds, (ii) one or more organic diamine compounds co-reactive therewith, and (iii) a polar, protic foam-enhancing additive, all at a temperature lower than the temperature which causes foaming, but high enough to produce a viscous, homogeneous, transparent solution or opaque suspension which can be poured from a container or spread uniformly on a horizontal surface. Preferably the diamines include at least one aromatic and/or aromatic heterocyclic primary diamine. Components (i) and (ii) are usually present in the mixture in essentially stoichiometric (substantially equal molar) quantities. Most preferably, such melt compositions further include a suitable quantity of a surfactant, most preferably a silicone glycol surfactant.

It will be apparent that this invention is susceptible to considerable variation in its practice without departing from the spirit and scope of the appended claims, the embodiments described hereinabove being merely exemplary of its practice.

I claim:

1. An expandable composition from which polyimide foam can be produced, said composition comprising a slurry which includes substantially equimolar amounts of at least one tetracarboxylic component consisting of at least one lower alkyl di-half-ester of a tetracarboxylic acid of the formula

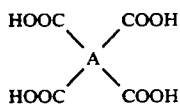

wherein A is an organic group and at least one diamine component together with a volatile polar protic foam-enhancing additive of the formula

ROH wherein R is selected from hydrogen and $C_1$ to $C_{12}$ linear or branched alkyl or cycloalkyl which can be unsubstituted or substituted with halo, aryl, alkoxy and hydroxy, all at a temperature sufficient to produce a viscous, homogeneous, transparent solution or opaque suspension, but not cause foaming.

2. The expandable composition of claim 1 in which A is of the formula

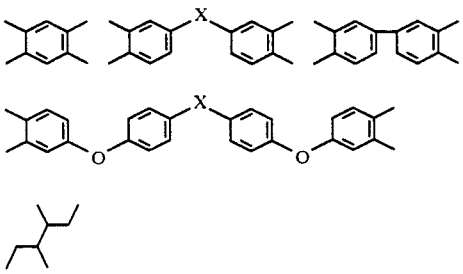

wherein X is selected from

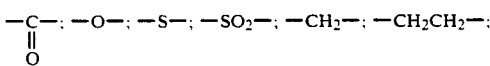

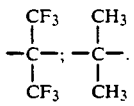

3. The expandable composition of claim 2 wherein the carboxylic component is selected from one or more of the lower alkyl di-half-esters of benzophenone tetracarboxylic acid; 1,2,3,4-butanetetracarboxylic acid; oxydiphthalic acid; and diphthalic acid.

4. The expandable composition of claim 1 wherein said diamine component includes at least one diamine of the formula

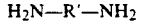

wherein R' is an organic group.

5. The expandable composition of claim 4 in which R' is selected from

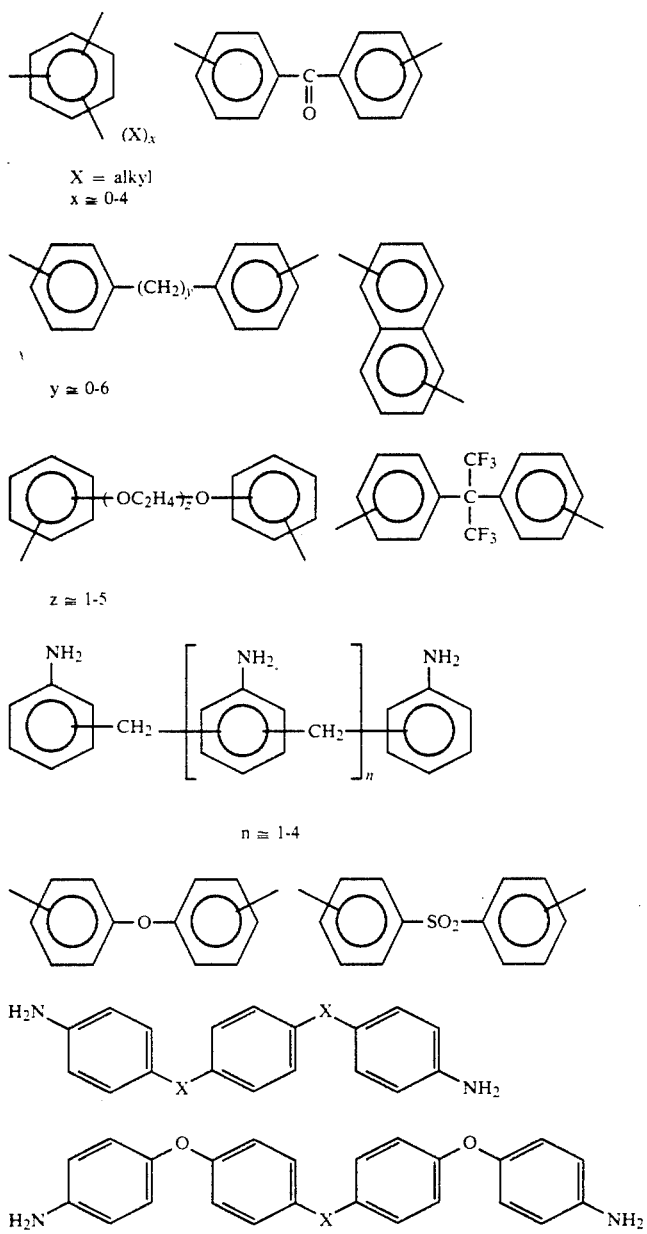

where X is selected from

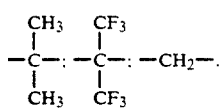

6. The expandable composition of claim 4 wherein the diamine component is selected from methylene dianiline; 2,6-dimethylpyridine; diaminopropylpolydimethylsiloxane; 2,2-bis[4-(4-aminophenoxy)phenyl]-propane; hexamethylenediamine; 1-(2-aminoethyl)piperazine; metaphenylenediamine; polyoxypropylenediamine; polyoxyethylenediamine; and 2-methylpentamethylenediamine.

7. The expandable composition of claim 1 wherein said polar protic foam-enhancing additive is selected from water and lower alkyl alcohols.

8. The expandable composition of claim 1 wherein said temperature is within the range of about 40° C. to about 105° C.

9. The expandable composition of claim 8 wherein said temperature is within the range of about 40° C. to about 60° C.

10. The expandable composition of claim 9 wherein the viscosity of said melt is about $5 \times 10^6$ cps to about $16 \times 10^7$ cps.

11. The expandable composition of claim 1 wherein the ratio by weight of the polar protic foam-enhancing additive to the carboxylic and diamine components combined is between about 1/200 and ½.

12. The expandable composition of claim 1 wherein the free volatiles in the metal comprise about 4 wt. % to about 15 wt. %.

13. The expandable composition of claim 1 wherein the total volatiles content of the melt is between about 10 wt. % and 40 wt. %.

* * * * *